United States Patent
Minagi

(10) Patent No.: US 10,942,969 B2
(45) Date of Patent: Mar. 9, 2021

(54) NON-TRANSITORY COMPUTER-READABLE STORAGE MEDIUM, SEARCH CONTROL METHOD, AND SEARCH CONTROL APPARATUS

(71) Applicant: FUJITSU LIMITED, Kawasaki-shi (JP)

(72) Inventor: Riho Minagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 16/038,854

(22) Filed: Jul. 18, 2018

(65) Prior Publication Data

US 2019/0026388 A1    Jan. 24, 2019

(30) Foreign Application Priority Data

Jul. 21, 2017  (JP) .............................. JP2017-141722

(51) Int. Cl.
| | |
|---|---|
| *G06F 16/835* | (2019.01) |
| *G06F 16/81* | (2019.01) |
| *G06F 16/84* | (2019.01) |
| *G06F 16/245* | (2019.01) |

(52) U.S. Cl.
CPC .......... *G06F 16/835* (2019.01); *G06F 16/245* (2019.01); *G06F 16/81* (2019.01); *G06F 16/84* (2019.01)

(58) Field of Classification Search
CPC ...... G06F 16/835; G06F 16/245; G06F 16/81; G06F 16/84
USPC ....................................................... 707/769
See application file for complete search history.

(56) References Cited

U.S. PATENT DOCUMENTS

| | | | | |
|---|---|---|---|---|
| 6,694,306 | B1 | 2/2004 | Nishizawa et al. | |
| 7,337,177 | B2 * | 2/2008 | Rys .......................... | G06F 16/30 707/769 |
| 7,539,692 | B2 * | 5/2009 | Min ...................... | G06F 40/123 |
| 2002/0123993 | A1 * | 9/2002 | Chau ....................... | G06F 16/86 |
| 2011/0307511 | A1 * | 12/2011 | Asai ....................... | G06F 16/832 707/769 |
| 2014/0279838 | A1 * | 9/2014 | Tsirogiannis ......... | G06F 16/235 707/603 |

FOREIGN PATENT DOCUMENTS

| | | |
|---|---|---|
| JP | 10-49408 | 2/1998 |
| JP | 2001-109758 | 4/2001 |
| JP | 2016-519810 | 7/2016 |
| WO | 2010/106681 | 9/2010 |

* cited by examiner

*Primary Examiner* — Joshua Bullock
(74) *Attorney, Agent, or Firm* — Fujitsu Patent Center

(57) ABSTRACT

A non-transitory computer-readable storage medium storing a program that causes a computer to execute a process, the process including searching data based on search conditions in response to receiving a search condition which designates an output data type, wherein the data is stored in a database, counting, for each of the searched data, a number of times each of the output data type is designated, storing type-converted data of at least one data in a storage device in association with the at least one data, generating, upon receiving, from a terminal device, a search condition which designates the specified output data type and by which the at least one data is searched, a search result by using the type-converted data stored in the storage device, and transmitting the search result to the terminal device.

7 Claims, 17 Drawing Sheets

FIG. 5

```
<root>
  <id>item001</id>
  <cost>100 yen</cost>
  <ymd>2017/01/01</ymd>
</root>
```
501

```
<root>
  <id>item002</id>
  <cost>300</cost>
  <ymd>2017/01/02</ymd>
</root>
```
502

FIG. 6

| TAG INFORMATION | TAG ID |
|---|---|
| /root | 1 |
| /root/id | 2 |
| /root/cost | 3 |
| /root/ymd | 4 |

FIG. 7

| XML DATA ID ⌒2221 | TAG ID ⌒2222 | DATA VALUE ⌒2223 |
|---|---|---|
| Rec_#1 | 1 | |
| Rec_#1 | 2 | item001 |
| Rec_#1 | 3 | 100 yen |
| Rec_#1 | 4 | 2017/01/01 |
| Rec_#2 | 1 | |
| Rec_#2 | 2 | item002 |
| Rec_#2 | 3 | 300 |
| Rec_#2 | 4 | 2017/01/02 |

Rows 1–4: 222-#1 val(/root/cost/text()) > 100     901

FIG. 11

| TAG INFORMATION <br>/1231 | DATA TYPE INFORMATION <br>/1232 | COUNT VALUE <br>/1233 | |
|---|---|---|---|
| /root/cost | int | 1000 | /123-#1 |
| /root/cost | text | 20 | /123-#2 |

FIG. 13

| TAG INFORMATION (1221) | TAG ID (1222) | TAG ID (CONVERTED TYPE) (1223) | DATA TYPE INFORMATION (1224) |
|---|---|---|---|
| /root | 1 | | |
| /root/id | 2 | | |
| /root/cost | 3 | 5 | int |
| /root/ymd | 4 | | |

| XML DATA ID | TAG ID | DATA VALUE |
|---|---|---|
| Rec_#1 | 1 | |
| Rec_#1 | 2 | item001 |
| Rec_#1 | 3 | 100 yen |
| Rec_#1 | 4 | 2017/01/01 |
| Rec_#2 | 1 | |
| Rec_#2 | 2 | item002 |
| Rec_#2 | 3 | 300 |
| Rec_#2 | 4 | 2017/01/02 |
| Rec_#1 | 5 | 100 |

NON-TRANSITORY COMPUTER-READABLE STORAGE MEDIUM, SEARCH CONTROL METHOD, AND SEARCH CONTROL APPARATUS

CROSS-REFERENCE TO RELATED APPLICATION

This application is based upon and claims the benefit of priority of the prior Japanese Patent Application No. 2017-141722, filed on Jul. 21, 2017, the entire contents of which are incorporated herein by reference.

FIELD

The embodiment discussed herein is related to a non-transitory computer-readable storage medium, a search control method, and a search control apparatus.

BACKGROUND

There is a technique called a schemaless database (DB). For example, in a database management system for a relational DB, the type of data to be stored is pre-defined by a schema. It is difficult to make changes to an already defined schema after the database is operated.

In contrast, a schemaless DB does not involve prior definition using a schema and has an advantage in that the data structure of the database can be relatively easily changed after data is stored.

A related technology is disclosed in International Publication Pamphlet No. WO2010/106681.

SUMMARY

According to an aspect of the invention, a non-transitory computer-readable storage medium storing a program that causes a computer to execute a process, the process including searching data based on search conditions in response to receiving a search condition which designates an output data type, wherein the data is stored in a database, counting, for each of the searched data, a number of times each of the output data type is designated, storing type-converted data of at least one data in a storage device in association with the at least one data, the type-converted data being obtained by converting the at least one data into a specified output data type determined based on the number of times for the at least one data, generating, upon receiving, from a terminal device, a search condition which designates the specified output data type and by which the at least one data is searched, a search result by using the type-converted data stored in the storage device, and transmitting the search result to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates examples of data stored in an XML data storage unit;

FIG. 6 is a table illustrating an example of data stored in a tag-management-information storage unit;

FIG. 7 is a table illustrating an example of data stored in a search-auxiliary-data storage unit;

FIG. 11 is a table illustrating an example of information stored in an analysis-information storage unit;

FIG. 13 is a table illustrating a form of information stored in the tag-management-information storage unit updated in step S1205;

FIG. 14 illustrates a form of the search-auxiliary-data storage unit in which generated type-converted data and information indicating the storage positions of the type-converted data are stored;

DESCRIPTION OF EMBODIMENT

However, the above-described schemaless DB also has drawbacks. For example, for a schemaless DB in which XML format data is stored, data that is stored in the database is text format data.

In this case, for example, search processing is assumed to be executed on the data stored in the text format, based on a search condition involving magnitude comparison using numerical values (for example, a search condition that records in which values in one data item are larger than or equal to a certain value are to be extracted). Hence, in order to perform the magnitude comparison, it is important that data in the search range have a numerical format. Thus, in a database management system, type conversion is performed on data having a text format (for example, a character string format) to generate data in which the data type is a numerical format (for example, an integer format or floating point format). The generated numerical-format data is used to search for data that matches the search condition.

When compared with a database in which data is stored in a format pre-defined by a schema, processing for data type conversion (that is, processing for generating data in which the type of data has been changed) occurs in search processing. Thus, there is a problem in that the speed of responding to a received search condition (search request) decreases.

Data having a data type other than an original data type may be pre-generated, considering that searching using a data type different from stored original data occurs. However, when the data type of data that is pre-generated and the data type involved in the searching differ from each other, processing for data type conversion is performed, thus reducing the response speed. Also, type-converted data for all data types that can be designated in the searching may be pre-generated, which is difficult in practice, since the amount of load in preprocessing and a storage area increase significantly.

One aspect of the present disclosure is intended to improve database search processing performance.

An embodiment for realizing the present disclosure will be described with reference to the accompanying drawings.

[Overview]

Figure 1:
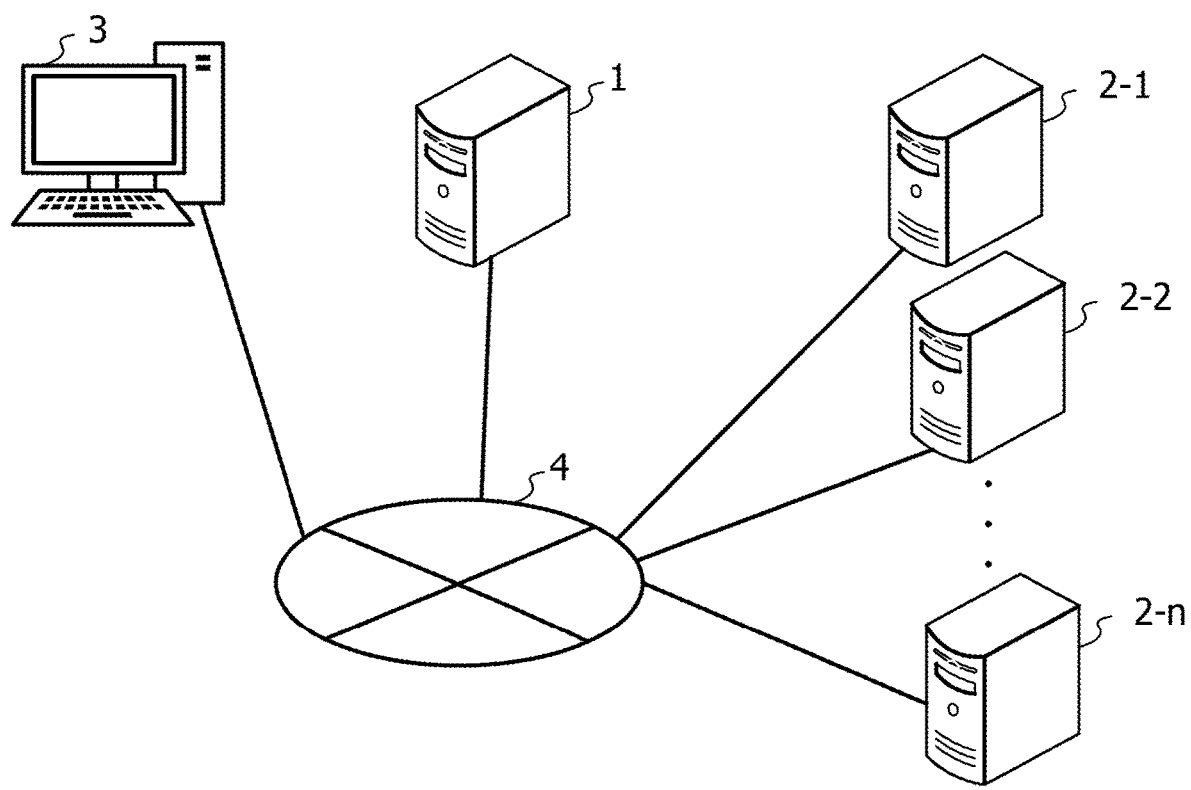
FIG. 1 is a diagram illustrating an example of a system configuration in the present embodiment.

FIG. 1 is a diagram illustrating an example of a system configuration in the present embodiment. An information processing system illustrated in FIG. 1 includes a management apparatus 1, search processing apparatuses 2-1 to 2-n, and a terminal apparatus 3.

The management apparatus 1 executes control on data search processing, based on a search request received from the terminal apparatus 3. The management apparatus 1 is communicably connected to the terminal apparatus 3 through a network 4 in a wired or wireless manner. The management apparatus 1 may be implemented by hardware, for example, a computer, such as a server apparatus.

Each of the search processing apparatuses 2-1 to 2-n executes data search processing, based on the search request received from the terminal apparatus 3. Each of the search processing apparatuses 2-1 to 2-n is communicably connected to the management apparatus 1 through the network 4 in a wired or wireless manner. Each of the search processing apparatuses 2-1 to 2-n may be implemented by hardware, for example, a computer, such as a server apparatus. In FIG. 1, the information processing system includes the plurality of search processing apparatuses 2-1 to 2-n and is adapted to be able to perform parallel processing or distribution processing on data searching. However, a specific number of search processing apparatuses 2-1 to 2-n and a specific configuration thereof are not limited to only the form illustrated in FIG. 1. In the following description, arbitrary search processing apparatuses of the search processing apparatuses 2-1 to 2-n may simply be referred to as "search processing apparatuses 2".

The terminal apparatus 3 transmits a data search request to the management apparatus 1. In the present embodiment, the data search request may be referred to as a "search query". A search result for the search request can be checked with, for example, the terminal apparatus 3. The terminal apparatus 3 is, for example, an information processing apparatus, such as a personal computer (PC), a smartphone, or a personal digital assistant (PDA).

A description will now be given of a brief overview of the data search processing in the information processing system. First, the terminal apparatus 3 transmits a search query to the management apparatus 1. Upon receiving the search query, the management apparatus 1 causes one or more of the search processing apparatuses 2 to execute data search processing, based on the contents of the received search query. Thereafter, the management apparatus 1 aggregates processing results of the search processing apparatus(es) 2 to generate a search result. The management apparatus 1 then transmits the search result to the terminal apparatus 3. The above description has been given of merely the brief overview of the search processing, and details thereof are described later.

[Functional Configuration of Management Apparatus 1]

Figure 2:
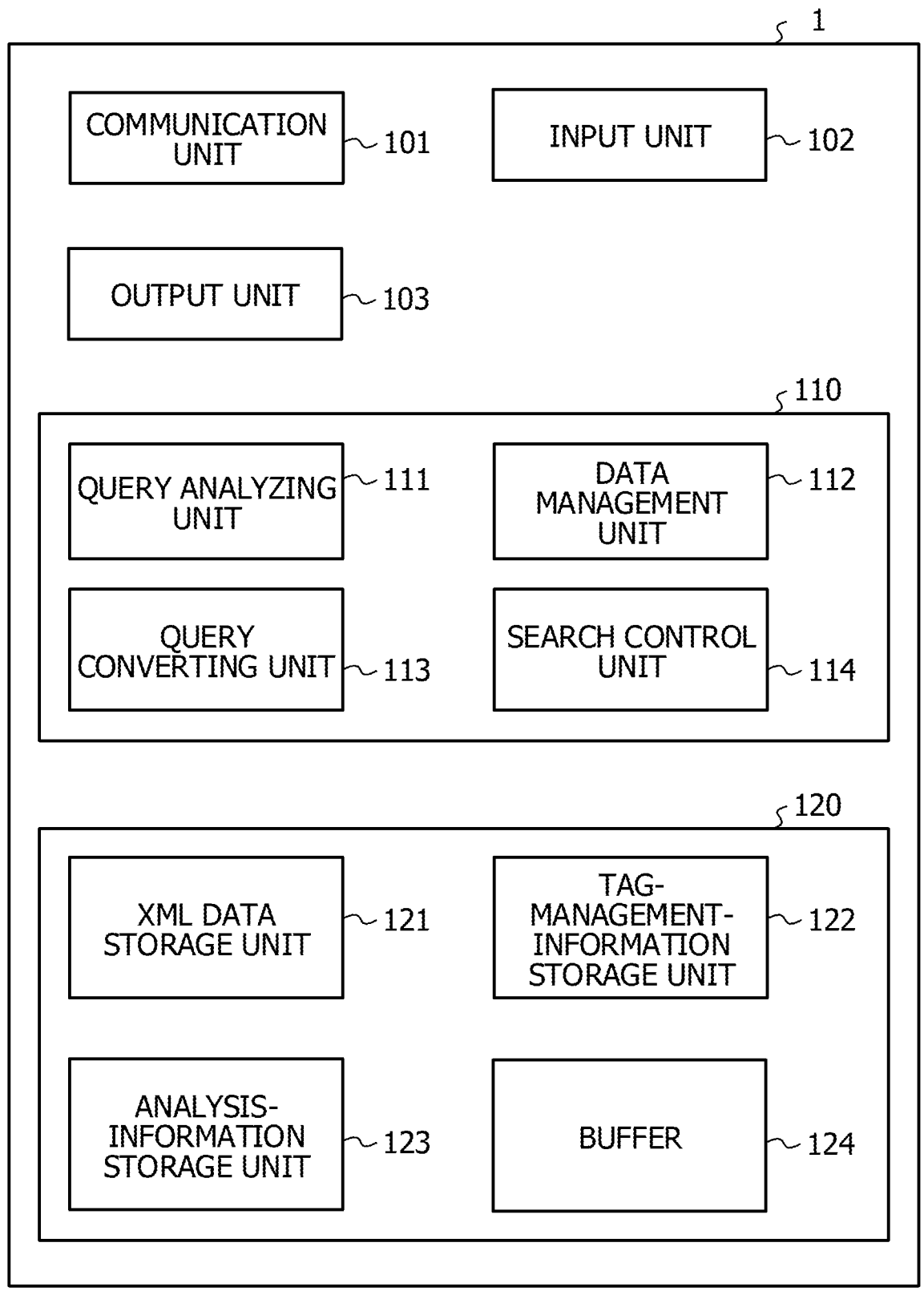
FIG. 2 is a functional block diagram illustrating the functional configuration of a management apparatus.

FIG. 2 is a functional block diagram illustrating the functional configuration of the management apparatus 1.

The management apparatus 1 includes, for example, a communication unit 101, an input unit 102, an output unit 103, a processing unit 110, and a storage unit 120.

The communication unit 101 is capable of executing communication with other apparatuses, including the search processing apparatuses 2-1 to 2-n, in a wired or wireless manner. The communication unit 101 is, for example, a communication device, such as a network adapter or a network interface controller (NIC), included in the management apparatus 1.

The input unit 102 receives information inputs and operations from users (including a system administrator). The input unit 102 may be implemented by hardware, for example, a keyboard, a mouse, and a touchpad. The output unit 103 is capable of outputting various types of information stored in the storage unit 120 and results of data search processing. The output unit 103 may be implemented by hardware, for example, a liquid-crystal display. The input unit 102 and the output unit 103 may or may not be included in the management apparatus 1, for example, when another information processing apparatus having the functions and the hardware of the input unit 102 and the output unit 103 is capable of remotely operating the management apparatus 1.

The processing unit 110 includes a query analyzing unit 111, a data management unit 112, a query converting unit 113, and a search control unit 114.

The query analyzing unit 111 executes analysis processing on a search query received from the terminal apparatus 3.

The data management unit 112 manages data stored in an eXtensible Markup Language (XML) data storage unit 121, which is described below. The data management unit 112 also executes update processing on information stored in a tag-management-information storage unit 122 and an analysis-information storage unit 123 and associated with the data stored in the XML data storage unit 121. The data management unit 112 is one form of an identifying unit and a count processing unit.

The query converting unit 113 executes query conversion processing when a search query received from the terminal apparatus 3 is transmitted to the search processing apparatuses 2-1 to 2-n.

The search control unit 114 executes control on search processing on data corresponding to a search query received from the terminal apparatus 3. For example, the search control unit 114 transmits a search query to the search processing apparatus(es) 2, aggregates search results received from the search processing apparatus(es) 2, and transmits an aggregated search result to the terminal apparatus 3.

The storage unit 120 includes the XML data storage unit 121, the tag-management-information storage unit 122, the analysis-information storage unit 123, and a buffer 124.

The XML data storage unit 121 is a storage unit in which data to be searched for is stored. In the present embodiment, the data to be searched for is XML format data. In other words, the information processing system in the present embodiment can be said to be a database in which XML format data is stored.

The tag-management-information storage unit 122 is a storage unit in which tag information for the data stored in the XML data storage unit 121 is stored.

The analysis-information storage unit 123 is a storage unit in which analysis results obtained by analyzing search queries received from the terminal apparatus 3 are stored (accumulated).

The buffer 124 may be used, for example, as a storage area in which search queries received from the terminal apparatus 3, processing results received from the search processing apparatuses 2, and so on are temporarily stored.

[Functional Configuration of Search Processing Apparatus 2]

Figure 3:
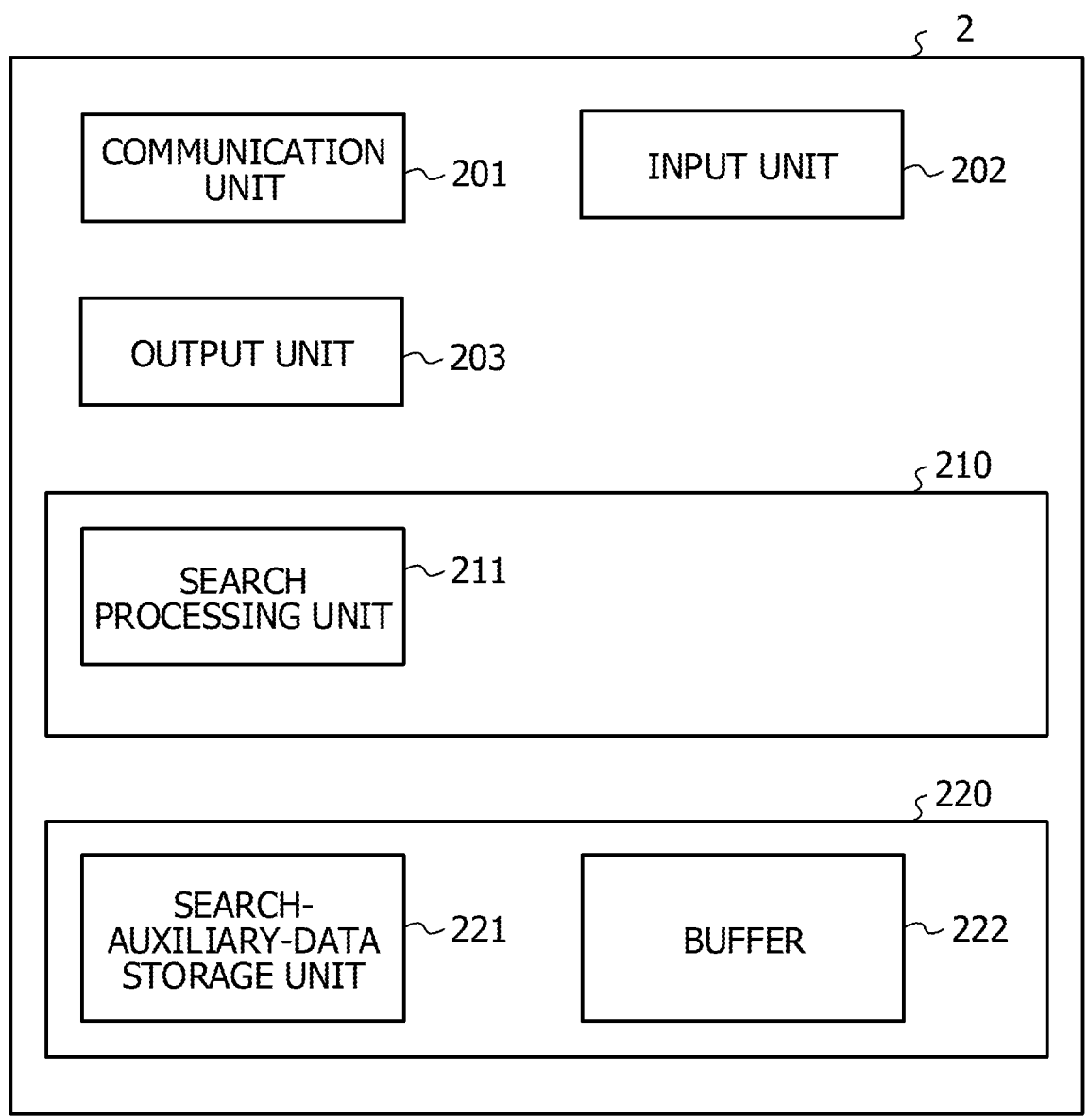
FIG. 3 is a functional block diagram illustrating the functional configuration of each search processing apparatus.

FIG. 3 is a functional block diagram illustrating the functional configuration of each search processing apparatus 2. The search processing apparatus 2 includes, for example, a communication unit 201, an input unit 202, an output unit 203, a processing unit 210, and a storage unit 220.

The communication unit 201 is capable of communicating with other apparatuses, including the management apparatus 1, in a wired or wireless manner. The communication unit 201 is, for example, a communication device, such as a network adapter or a NIC, included in the search processing apparatus 2.

The input unit 202 receives information inputs and operations from users (including a system administrator). The input unit 202 may be implemented by hardware, for example, a keyboard, a mouse, and a touchpad. The output unit 203 is capable of outputting, for example, results of data search processing executed by the search processing apparatus 2. The output unit 203 may be implemented by hardware, for example, a liquid-crystal display. As in the management apparatus 1, the input unit 202 and the output unit 203 may or may not be included in the search processing apparatus 2, when another information processing apparatus having the functions and the hardware of the input unit 202 and the output unit 203 is capable of remotely operating the search processing apparatus 2.

The processing unit 210 includes a search processing unit 211. The search processing unit 211 executes search processing requested by the management apparatus 1.

The storage unit 220 includes a search-auxiliary-data storage unit 221 and a buffer 222.

The search-auxiliary-data storage unit 221 stores search auxiliary data used for data search processing to be executed by the search processing apparatus 2.

The buffer 222 may be used, for example, as a storage area in which processing results of data search processing, data generated in the middle of data search processing, and so on are temporarily stored.

[Functional Configuration of Terminal Apparatus 3]

Figure 4:
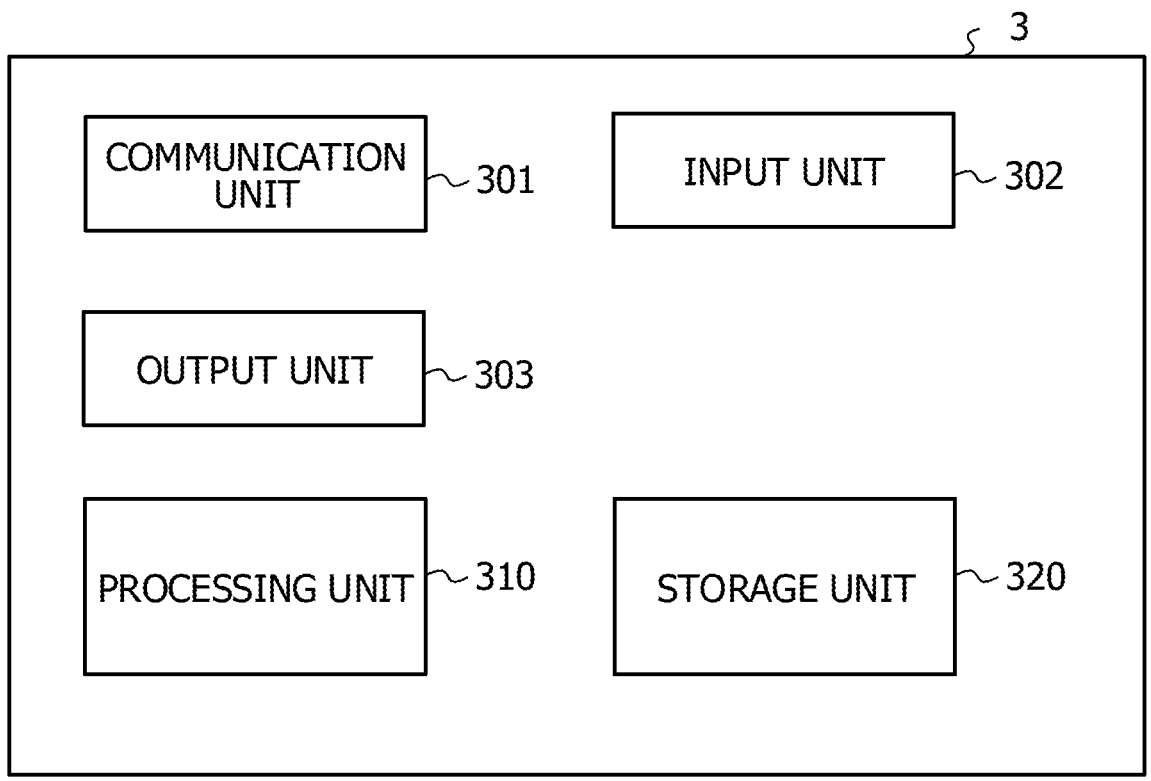
FIG. 4 is a functional block diagram illustrating the functional configuration of a terminal apparatus.

FIG. 4 is a functional block diagram illustrating the functional configuration of the terminal apparatus 3. The terminal apparatus 3 includes, for example, a communication unit 301, an input unit 302, an output unit 303, a processing unit 310, and a storage unit 320.

The communication unit 301 is capable of communicating with other apparatuses, including the management apparatus 1, in a wired or wireless manner. The communication unit 301 is, for example, a communication device, such as a network adapter or a NIC, included in the terminal apparatus 3.

The input unit 302 receives information inputs and operations (including a search request input and a transmission operation) from users (including a system administrator). The input unit 302 may be implemented by hardware, for example, a keyboard, a mouse, and a touchpad. The output unit 303 is capable of outputting, for example, a result of search processing executed based on a search request executed by the terminal apparatus 3. The output unit 203 may be implemented by hardware, for example, a liquid-crystal display.

The processing unit 310 executes control on various types of processing executed by the terminal apparatus 3. The types of processing include transmission of a search query, reception of a search result, and output of a search result.

The storage unit 320 may be used to store, for example, data of a search result.

[XML Data Storage Unit 121]

FIG. 5 illustrates examples of data stored in the XML data storage unit 121. The XML data storage unit 121 stores XML format data therein, as illustrated in FIG. 5. The data illustrated in FIG. 5 is text format data structured using tags according to an XML format. In the following description, XML format data like that illustrated in FIG. 5 may be referred to as "XML data".

[Tag-Management-Information Storage Unit 122]

FIG. 6 is a table illustrating an example of data stored in the tag-management-information storage unit 122. For example, tag information 1221 and tag identifiers (IDs) 1222 are stored in the tag-management-information storage unit 122 in association with each other.

Each piece of tag information 1221 indicates a tag for a data value included in the XML data stored in the XML data storage unit 121. Each tag ID 1222 is identification information that makes it possible to uniquely identify the corresponding tag indicated by the tag information 1221.

For example, the tag information 1221 and the tag IDs 1222 illustrated in FIG. 6 correspond to the XML data exemplified with reference to FIG. 5. In XML data 501 in FIG. 5, a tag <root> exists first, and a tag <id>, a tag <cost>, and a tag <ymd> exist in a lower layer of the tag <root>. In FIG. 6 and a subsequent description, for example, a tag in which a tag <id> exists in the lower layer of a tag <root> is referred to as "/root/id".

In the example of the XML data 501 in FIG. 5, it can be said that four tags, that is, a tag "/root", a tag "/root/id", a tag "/root/cost", and a tag "/root/ymd", appear in the XML data 501. The tag information 1221 and the tag IDs 1222 illustrated in FIG. 6 correspond to the four tags. For example, tag ID "1" is set for the tag "/root", as illustrated in FIG. 6. Similarly, tag IDs are set for other tags, as illustrated in FIG. 6.

As described above, information in which unique tag IDs that are associated with all respective types of tag that appear in the XML data stored in the XML data storage unit 121 is stored in the tag-management-information storage unit 122. However, when the same tag appears in XML data other than the XML data 501, the tag information 1221 and the tag IDs 1222 may or may not be redundantly stored. For example, when the XML data 501 and XML data 502 illustrated in FIG. 5 are stored in the XML data storage unit 121, the tags that appear in the XML data 502 are the same as the tags that appear in the XML data 501. In such a case, by using the tag information 1221 and the tag IDs 1222 illustrated in FIG. 6, the management apparatus 1 can collectively manage the tags that appear in the XML data 501 and 502. FIGS. 5 and 6 are merely examples for describing the present embodiment, and information stored in the tag-management-information storage unit 122 changes as appropriate in accordance with a change in the XML data stored in the XML data storage unit 121.

[Search-Auxiliary-Data Storage Unit 221]

FIG. 7 is a table illustrating an example of data stored in the search-auxiliary-data storage unit 221. In the example illustrated in FIG. 7, for example, XML data IDs 2221, tag IDs 2222, and data values 2223 are stored in the search-auxiliary-data storage unit 221 in association with each other.

The XML data IDs 2221 are identification information for uniquely identifying corresponding XML data stored in the XML data storage unit 121. For convenience of description, in FIG. 7, the XML data IDs of the XML data 501 and 502 illustrated in FIG. 5 are assumed to be "Rec_#1" and "Rec_#2", respectively. However, a specific data format and values of the XML data IDs 2221 may be changed as appropriate, as long as each piece of XML data is uniquely identifiable.

The tag IDs 2222 are identification information that makes it possible to uniquely identify respective tags that appear in the XML data, and are information that is similar to the tag ID 1222 illustrated in FIG. 6. That is, it can be said that each tag ID 2222 is, in the tag-management-information storage unit 122, identification information indicating a tag indicated in the tag information 1221 associated with the tag ID 2222 having the same value as the tag ID 1222.

The data values 2223 are information indicating values corresponding to tags included in the XML data.

In the examples illustrated in FIGS. 5 and 7, the XML data 501 includes value "item001" for the tag "/root/id", value "100 yen" for the tag "/root/cost", and value "2017/01/01" for the tag "/root/ymd" as data values. The XML data 501 does not include a value for the tag "/root". Data 222-#1 illustrated in FIG. 7 is stored in the search-auxiliary-data storage unit 221 as information corresponding to the form of the XML data 501. By referring to the data 222-#1, each search processing apparatus 2 can identify the values of data included in the XML data 501 and tags corresponding to the values, without scanning the XML data 501. In other words, when information about all XML data stored in the XML data storage unit 121 is stored in the search-auxiliary-data storage unit 221, each search processing apparatus 2 can execute data search processing without scanning the XML data storage unit 121.

The types of information illustrated in FIG. 7 are generated for all XML data stored in the XML data storage unit 121 and are updated in accordance with addition, update, deletion, and so on in the XML data. When the management apparatus 1 and the search processing apparatuses 2 are independent apparatuses, and a plurality of search processing apparatuses 2 is provided, as in the information processing system in the present embodiment, pieces of information that are divided according to the number of search processing apparatuses 2 may be stored in the respective search processing apparatuses 2. This makes it possible to perform parallel processing or distribution processing in data searching using a plurality of search processing apparatuses 2. For example, through use of the technology disclosed in International Publication Pamphlet No. WO2010/106681 or the like, the management apparatus 1 or the search processing apparatuses 2 can generate information stored in the search-auxiliary-data storage unit 221 by scanning and analyzing XML data.

[Analysis Processing]

Figure 8:
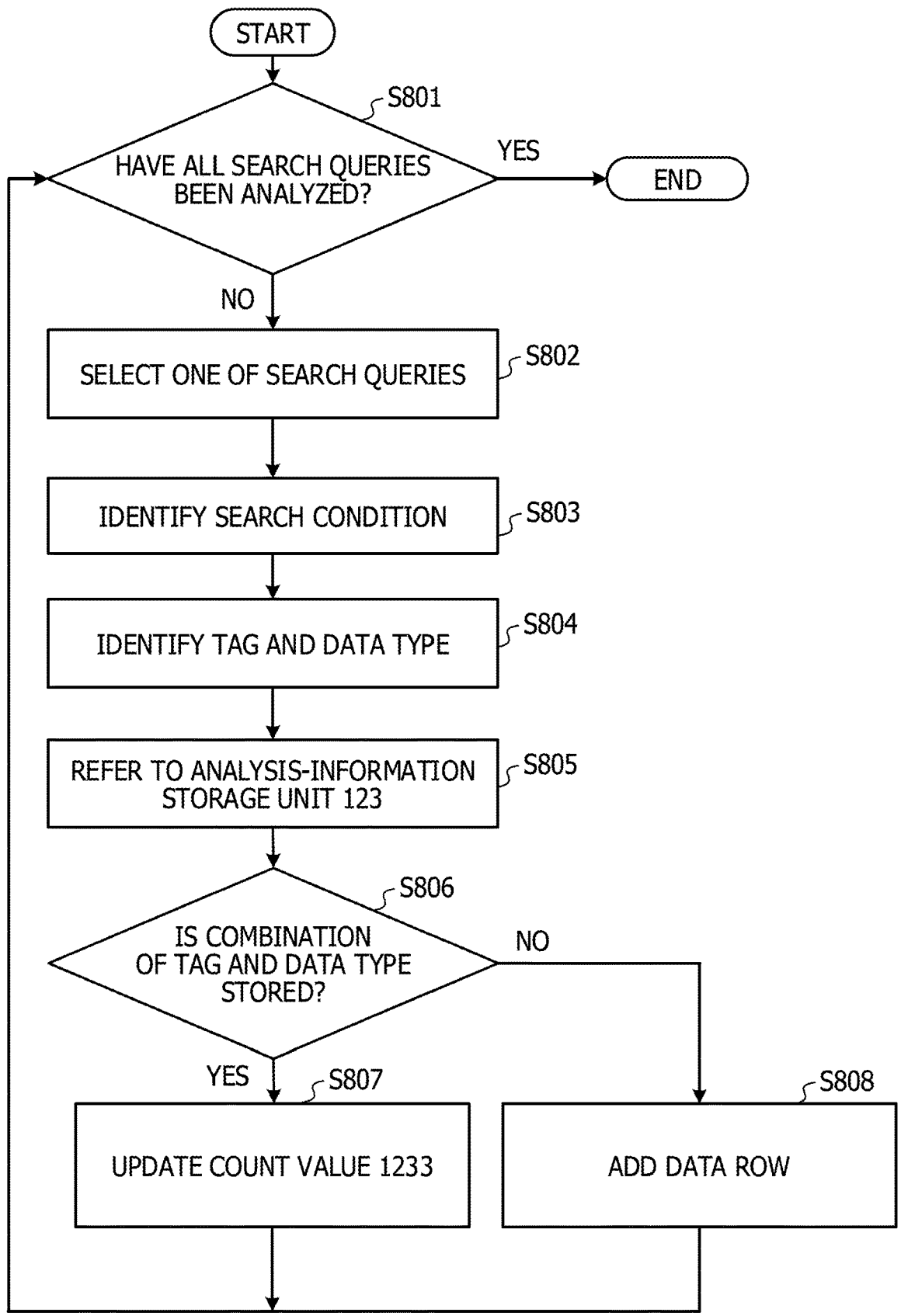
FIG. 8 is a flowchart illustrating a flow of analysis processing on search queries received by the management apparatus.

FIG. 8 is a flowchart illustrating a flow of analysis processing (query analysis processing) on search queries received by the management apparatus 1. The query analysis processing, which will be described with reference to FIG. 8, may be sequentially executed when the management apparatus 1 receives a search query from the terminal apparatus 3. Alternatively, in the query analysis processing, analysis processing for search queries received in a certain period of time may be collectively executed at a timing set by a system administrator or the like.

First, the query analyzing unit 111 in the management apparatus 1 determines whether or not all search queries of interest have been analyzed (step S801). The "all search queries of interest" correspond to a received latest search query when the query analysis processing is sequentially executed upon reception of a search query from the terminal apparatus 3. Also, when analysis processing is collectively executed on search queries received in a certain period of time, all search queries of interest are all the search queries received in the certain period of time. When analysis processing is collectively executed on search queries received in a certain period of time, for example, the management apparatus 1 may store the search queries, received in the certain period of time, in the buffer 124 and may read the search queries from the buffer 124, as appropriate, during query analysis processing.

If all search queries of interest have been analyzed (YES in step S801), the query analysis processing illustrated in FIG. 8 ends.

On the other hand, if all search queries of interest have not been analyzed (NO in step S801), the query analyzing unit 111 selects one of the search queries of interest (step S802).

The query analyzing unit 111 analyzes the selected search query and identifies a search condition designated by the search query (step S803). The query analyzing unit 111 then identifies tags and the type of data (data type) designated by the search condition (step S804).

Figure 9:
FIG. 9 illustrates an example of a search condition.

FIG. 9 illustrates an example of a search condition. A search condition 901 illustrated in FIG. 9 is a search condition that XML data in which the value of text data for tag "/root/cost" is larger than 100 is to be searched for. In this case, character-string-format data values are written in the XML data, and the search condition 901 designates the search condition indicating "larger than 100" by using a val function. The val function is a function in which a numerical-format data value is used as an argument. Thus, in search processing based on the search condition illustrated in FIG. 9, in order to perform processing for numerical data magnitude comparison with respect to data values, it is important that the data values have a numerical format. That is, the search condition 901 in FIG. 9 can be said to be a search condition designating a numerical-format data type.

The query analyzing unit 111 may identify the data type designated by the search condition, for example, based on a function (for example, the val function in the case of the search condition 901) used for the search condition.

Figure 10:
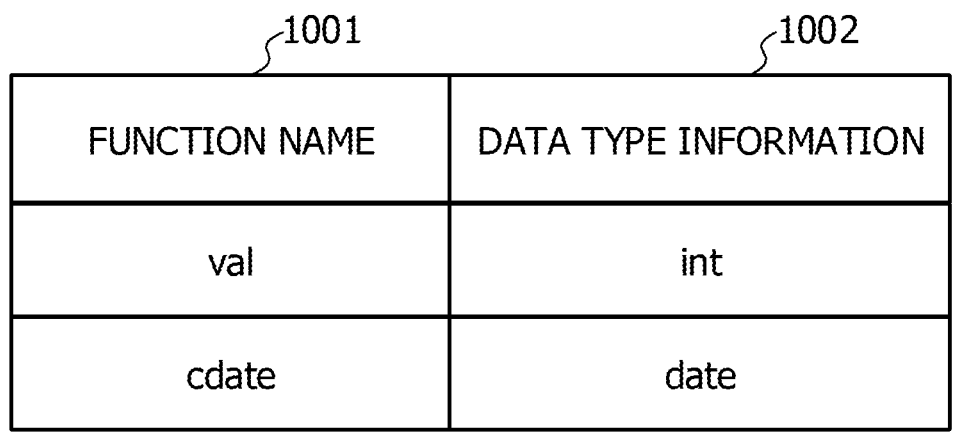
FIG. 10 is a table illustrating correspondence relationships between functions and data types.

FIG. 10 is a table illustrating correspondence relationships between functions and data types. In FIG. 10, function names 1001 indicating the names of functions and data type information 1002 indicating data types corresponding to the functions are associated with each other.

As illustrated in FIG. 10, a data type that is designated (that is used as an argument) differs from one function from another. Thus, by identifying a function included in a search condition and a data type designated for the function, it is possible to identify a data type designated by the search condition. For example, FIG. 10 indicates that the val function is a function for designating an int format (a numerical format) as a data type, and the cdate function is a function for designating a date format as a data type. The correspondence relationships between the functions and the data types, as illustrated in FIG. 10, may be pre-held, for example, in a storage area in the storage unit 120 in the management apparatus 1. Alternatively, during operation of the information processing system, the correspondence relationship between each function and a data type may be identified by identifying the data type of data actually obtained (converted) by the processing of the function.

Referring back to FIG. 8, after step S804 is finished, the query analyzing unit 111 refers to the information stored in the analysis-information storage unit 123 (step S805). The query analyzing unit 111 then determines whether or not information indicating a combination of the tag and the data type identified in step S804 is stored in the analysis-information storage unit 123 (step S806).

FIG. 11 is a table illustrating an example of the information stored in the analysis-information storage unit 123. For example, tag information 1231, data type information 1232, and count values 1233 are stored in the analysis-information storage unit 123 in association with each other. The information stored in the analysis-information storage unit 123 is stored (accumulated) information of results of analysis performed by the query analyzing unit 111 with respect to search queries received in a predetermined period of time.

The tag information 1231 may have a form that is the same as or similar to, for example, that of the tag information 1221 in FIG. 6 and indicates tags corresponding to data. Similarly to the tag information, the data IDs are also information indicating tags corresponding to data, and thus, the data column for the tag information 1231 may be, for example, a data column indicating tag IDs corresponding to the tag information.

The data type information 1232 is information indicating data types.

Each count value 1233 is information indicating the number of times a designation of a combination of the tag indicated by the corresponding tag information 1231 and the data type indicated by the corresponding data type information 1232 appeared in search queries received in a predetermined period of time, which is a period for analysis.

For example, data row 123-#1 in FIG. 11 indicates that a search query designating the int type as a data type with respect to data for the tag "/root/cost" was received 1000 times in the predetermined period of time. Data row 123-#2 in FIG. 11 indicates that a search query designating a text format (a character string format) as a data type with respect to data for the tag "/root/cost" was received 20 times in the predetermined period of time. Thus, information indicating that, with respect to each tag, which data type was designated and how many times each data type was designated in search queries received in the predetermined period of time is stored in the analysis-information storage unit 123.

In a specific example of step S806, for instance, the search condition 901 illustrated in FIG. 9 is a search condition for designating a combination of the tag "/root/cost" and a numerical-format data type. In the state illustrated in FIG. 11, information designating a combination of the tag "/root/cost" and a numerical-format data type is stored in the analysis-information information storage unit 123, as indicated in data row 123-#1. In such a case, the query analyzing unit 111 determines that information indicating a combination of the tag and the data type identified in step S804 is stored in the analysis-information storage unit 123 (YES in step S806). On the other hand, if a data row corresponding to the combination identified in step S804 does not exist in the analysis-information storage unit 123, the query analyzing unit 111 determines that information indicating a combination of the tag and the data type identified in step S804 is not stored in the analysis-information storage unit 123 (NO in step S806).

If the result of the determination in step S806 is affirmative (YES in step S806), the query analyzing unit 111 updates the count value 1233 in the data row corresponding to the combination identified in step S804, the data row being stored in the analysis-information storage unit 123 (step S807). Specifically, the query analyzing unit 111 increments the numerical value of the count value 1233 in the data row corresponding to the combination identified in step S804.

On the other hand, if the result of the determination in step S806 is negative (NO in step S806), the query analyzing unit 111 additionally stores, in the analysis-information storage unit 123, a data row corresponding to the combination identified in step S804 (step S808). In this case, the numerical value of the count value 1233 is set to 1.

After executing the process in step S807 or S808, the query analyzing unit 111 executes step S801 again. If all search queries of interest have been analyzed (YES in step S801), the query analysis processing illustrated in FIG. 8 ends.

[Information Update (Generation of Type-Converted Data)]

Figure 12:
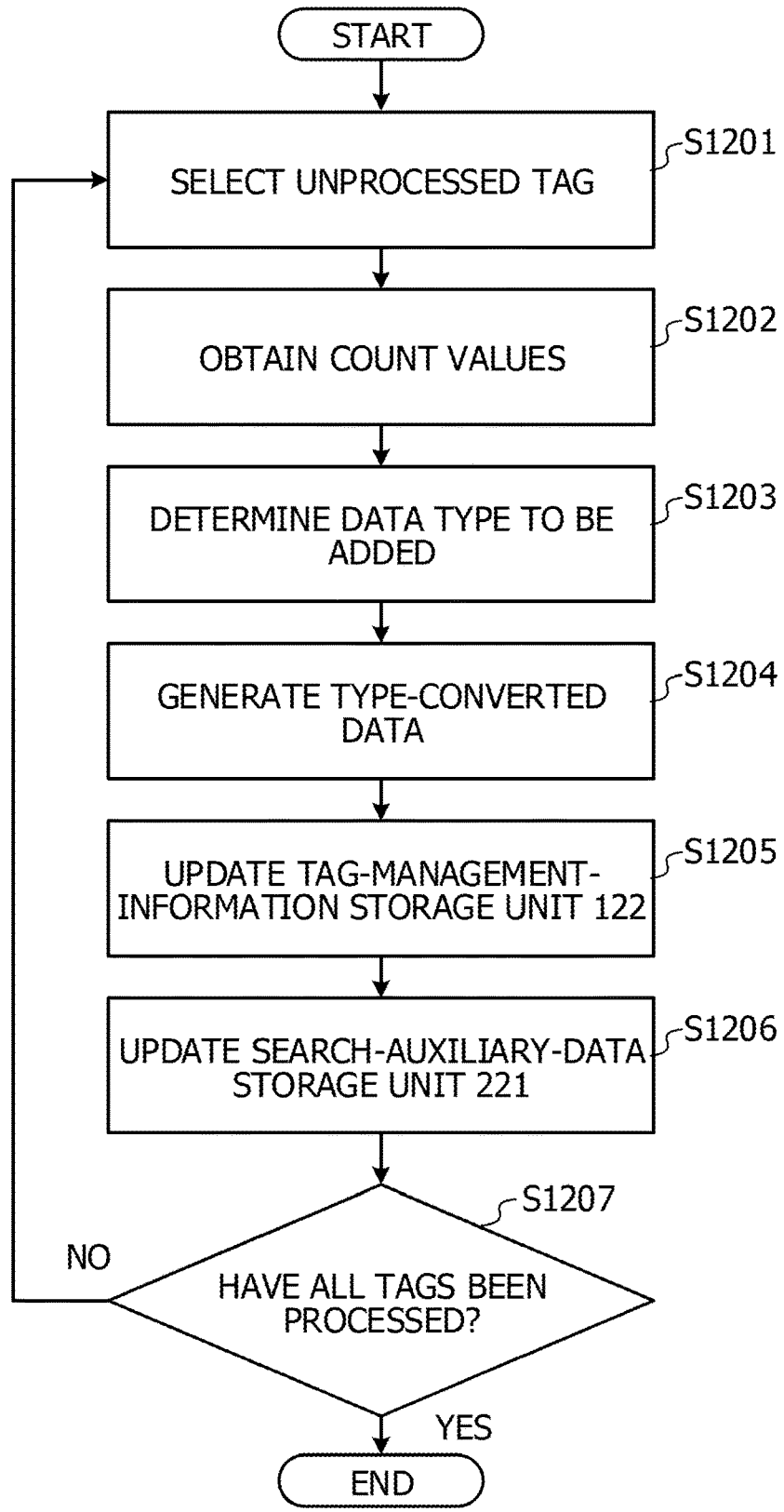
FIG. 12 is a flowchart illustrating a flow of processing executed by a data management unit.

FIG. 12 is a flowchart illustrating a flow of processing executed by the data management unit 112.

First, the data management unit 112 refers to the analysis-information storage unit 123 to select an unprocessed tag from tags for which information is stored in the analysis-information storage unit 123 (step S1201). The data management unit 112 then identifies, in the analysis-information storage unit 123, the data type information 1232 and the count values 1233 associated with the tag information 1231 indicating the selected tag. With respect to the data types indicated by the data type information 1232, the data management unit 112 obtains the values of the corresponding count values 1233 (step S1202). Based on the obtained values of the count values 1233, the data management unit 112 determines a data type to be added (step S1203).

In this case, the data type to be added is the data type of data to be added to the search-auxiliary-data storage unit 221 in processing described below. The data type to be added may be, for example, a data type that is indicated by the data type information 1232 and that is associated with a largest count value of the values in the count values 1233 which were obtained in step S1202. Alternatively, the data type to be added may be, for example, a data type that is indicated by the data type information 1232 and that is associated with count values of a predetermined number (for example, two) of high-order values of the values in the count values 1233 which were obtained in step S1202. Alternatively, the data type to be added may be a data type that is indicated by the data type information 1232 and that is associated with a count value included in the values in the count values 1233 which were obtained in step S1202, the count value being larger than or equal to a predetermined threshold.

When the data type to be added is determined in step S1203, the data management unit 112 reads, from the XML data stored in the XML data storage unit 121, the value of data corresponding to the tag selected in step S1201. The data management unit 112 then generates type-converted data, which is obtained by converting the read data into the data type to be added (step S1204). After finishing step S1203, the data management unit 112 may delete the information about the tag selected in step S1201 from the analysis-information storage unit 123, in order to indicate that the data type to be added about the tag selected in step S1201 has been determined.

The data management unit 112 updates the information stored in the tag-management-information storage unit 122 (step S1205).

Also, the data management unit 112 updates the information stored in the search-auxiliary-data storage unit 221 (step S1206). Specifically, the generated type-converted data and information indicating the storage position of the type-converted data are associated with each other and are stored in the search-auxiliary-data storage unit 221.

The processes in steps S1202 to S1206 will be described using a specific example. For example, in the example of the tag "/root/cost", in FIG. 11, the count values 1233 associated with the tag information 1231 for the tag "/root/cost" are "1000" and "20". The count value "1000" corresponds to the data type "int", which is a numerical format, and the count value "20" corresponds to the data type "text", which is a character string format.

That is, the state illustrated in FIG. 11 indicates that the management apparatus 1 received a search query designating the data type "int" 1000 times and received a search query designating the data type "text" 20 times in a predetermined period of time with respect to data for the tag "/root/cost". For example, when the determination condition for determining the data type to be added is a data type that is indicated by the data type information 1232 and that is associated with the largest count value, the data type to be added about data for the tag "/root/cost" is "int". The description thus far corresponds to steps S1202 and S1203. The number of data types to be added is not limited to one, and for example, a plurality of data types may be determined in descending order of the count values as data types to be added. Alternatively, a threshold may be set for the count values, and a data type for which the count value is larger than or equal to the threshold may be determined to be a data type to be added. For example, a reception frequency of search queries per unit time, instead of the count values 1233, may be recorded.

In addition, an int-type data value is generated as type-converted data corresponding to the data for the tag "/root/cost". For example, in the case of the XML data 501 illustrated in FIG. 5, the value of the data for the tag "/root/cost" is "100 yen". For generating the int-type data value, the data management unit 112 generates binary data of the numerical value "100". This process corresponds to step S1204 described above.

Next, a process in which, upon generating type-converted data, the tag-management-information storage unit 122 updates information stored in the data management unit 112 will be described in conjunction with an example. This process corresponds to step S1205 described above.

FIG. 13 is a table illustrating a form of information stored in the tag-management-information storage unit 122 updated in step S1205. Although tag information 1221 and tag IDs 1222 illustrated in FIG. 13 are the same as those illustrated in FIG. 6, there is a difference in that the information in the tag-management-information storage unit 122 further includes tag IDs (converted type) 1223 and data type information 1224.

The data column of the tag IDs (converted type) 1223 indicates tag IDs corresponding to tags given to generated type-converted data.

The data column of the data type information 1224 indicates data types of type-converted data.

A value that differs from any of the values included in the data column of the tag IDs 1222 is uniquely given, as the tag ID (converted type) 1223, to a combination of the tag (or the tag ID indicated by the tag ID 1222) indicated by the tag information 1221 and the data type to be added. In the case in FIG. 13, with respect to the combination of the tag "/root/cost" (or tag ID "3") and the int type that is the data type to be added, value "5" is given as the tag ID (converted type) 1223.

Thereafter, the data management unit 112 stores the generated type-converted data and information indicating the storage position of the type-converted data in the search-auxiliary-data storage unit 221 in association with each other. This process corresponds to step S1206 described above.

FIG. 14 illustrates a form of the search-auxiliary-data storage unit 221 in which generated type-converted data and information indicating the storage positions of the type-converted data are stored. In steps S1204 to S1206, information about the generated type-converted data has been added to the state illustrated in FIG. 7.

Specifically, in the form in FIG. 14, a data row 222-#2 is newly generated, compared with the state in FIG. 7. The data row 222-#2 is a data row in which the value of the XML data ID 2221 is "Rec_#1", the value of the tag ID 2222 is "5", and the data value 2223 is binary data of the numerical value "100". The value "5" of the tag ID 2222 corresponds to the value "5" of the tag ID (converted type) 1223 described above with reference to FIG. 13.

In the illustrated example, the binary data of the numerical value "100" is stored. In the example illustrated in FIG. 14, a numerical value surrounded by a rectangular frame is assumed to indicate binary data corresponding to the surrounded numerical value, for convenience of description. The data row 222-#2 illustrated in FIG. 14 indicates that tag ID "5" and the data value "100 (binary data)" are included as values included in the XML data illustrated in "Rec_#1". Thus, new data for searching which corresponds to the data type to be added which was determined in step S1203 is generated in the search-auxiliary-data storage unit 221.

In this case, for example, the management apparatus 1 and the search processing apparatuses 2 operate in cooperation with each other to thereby update the information stored in the search-auxiliary-data storage unit 221.

As a specific example, first, the data management unit 112 in the management apparatus 1 generates XML data in which type-converted data is embedded, based on the information in the tag-management-information storage unit 122 updated in step S1205. For example, in the above-described example, the XML data in which the type-converted data is embedded is new XML data obtained by additionally writing information in which the tag ID "5" (or a tag correspond to the tag ID "5") and the data value "100 (binary data)" are associated with each other to the XML data 501 indicated by "Rec_#1".

The data management unit 112 transmits the generated new XML data to the search processing apparatuses 2. The XML data transmitted to the search processing apparatuses 2 in this case may be the entire new XML data or may be, of the new XML data, partial data including the additionally written information.

Upon receiving the new XML data, the processing unit 210 in each search processing apparatus 2 scans and analyzes the received new XML data to obtain various types of information to be stored in the search-auxiliary-data storage unit 221. The information that is obtained in this case includes information corresponding to type-converted data (for example, information corresponding to the data row 222-#2 illustrated in FIG. 14). Based on the obtained information, the processing unit 210 updates the information stored in the search-auxiliary-data storage unit 221. In this case, after updating the information stored in the search-auxiliary-data storage unit 221, each search processing apparatus 2 may or may not hold the received new XML data.

The information stored in the search-auxiliary-data storage unit 221 is updated in accordance with the processing flow described above. However, the above-described processing flow is merely one form of the update processing, and one of the management apparatus 1 and the search processing apparatus 2 may play the main role of updating the information stored in the search-auxiliary-data storage unit 221.

In the illustrated form, as a result of executing the processes in steps S1205 and S1206, the information in the search-auxiliary-data storage unit 221 and the tag-management-information storage unit 122 is updated to the information as illustrated in FIGS. 13 and 14.

Referring back to FIG. 12, after executing step S1206, the data management unit 112 determines whether or not all tags for which the information is stored in the analysis-information storage unit 123 have been processed (step S1207). The expression "all tags have been processed" in this case means that the above-described processes in steps S1201 to S1206 have been executed. If all tags have not been processed, that is, if there are tags on which the processes in steps S1201 to S1206 have not been executed (NO in step S1207), the data management unit 112 executes the process in step S1201 on any of the unprocessed tags. If all tags have been processed (YES in step S1207), the series of processes illustrated in FIG. 12 ends.

[Data Search Processing]

Figure 15:
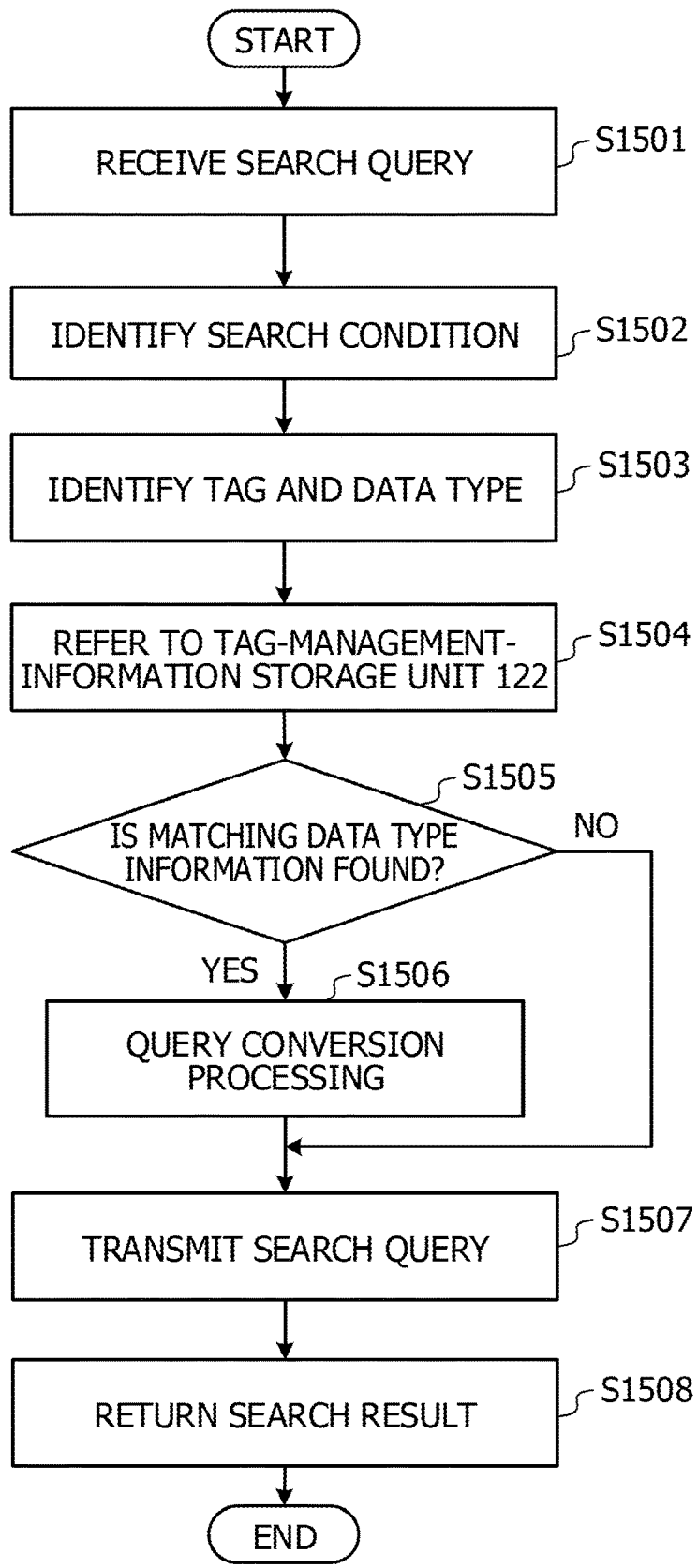
FIG. 15 is a flowchart illustrating the flow of a series of processes in data search processing.

Data search processing in the present embodiment will now be described. FIG. 15 is a flowchart illustrating the flow of a series of processes in the data search processing.

First, when the management apparatus 1 receives a search query from the terminal apparatus 3 (step S1501), the query analyzing unit 111 identifies a search condition designated by the search query (step S1502). The query analyzing unit 111 then identifies a tag and the type of data (data type) designated by the search condition (step S1503). The specific processes in steps S1501 to S1503 may be executed, for example, similarly to steps S802 to S804 in FIG. 8.

Subsequently, the query analyzing unit 111 refers to the tag-management-information storage unit 122 (step S1504).

The query analyzing unit 111 determines whether or not a data type that matches the data type identified in step S1503 is stored in the tag-management-information storage unit 122 in association with the tag identified in step S1503 (step S1505). Specifically, with respect to the tag information 1221 in the tag-management-information storage unit 122, the query analyzing unit 111 searches for a data row indicating the tag identified in step S1503. If a data row indicating the tag identified in step S1503 is found, the query analyzing unit 111 determines whether or not a value is stored in the data type information 1224 in the found data row. If a value is stored in the data type information 1224, it is determined that a data type that matches the data type identified in step S1503 is stored in the tag-management-information storage unit 122 (YES in step S1505). On the other hand, if a value is not stored in the data type information 1224, it is determined that a data type that matches the data type identified in step S1503 is not stored in the tag-management-information storage unit 122 (NO in step S1505).

If the determination result in step S1505 is YES, processing (query conversion processing) for converting the search query received in step S1501 is executed (step S1506). Specifically, for example, the query analyzing unit 111 obtains the value in the tag ID (converted type) 1223 in the data row found in step S1505. Then, a search query (a post-conversion search query) in which the tag in the received search query is changed to the tag indicated by the value in the obtained tag ID (converted type) 1223 is generated.

In this case, in the post-conversion search query, the tag corresponding to text data (that is, the tag designated by the search query received in step S1501) has been changed to a tag for type-converted data. Also, the type-converted data is stored in the search-auxiliary-data storage unit 221 in association with the tag for the type-converted data.

Thus, when data search processing according to a post-conversion search query is executed, type-converted data whose data type has been changed is obtained instead of text data. In this case, it is possible to omit processing for data type conversion executed during data search processing.

After the post-conversion search query is generated, a process in step S1507 is executed.

On the other hand, if the determination result in step S1505 is NO, the process in steps S1507 is executed without executing the process in step S1506.

The search control unit 114 transmits a search query to the search processing apparatuses 2 to cause search processing to be executed (step S1507). If the determination result in step S1505 is YES, the search query transmitted in step S1507 is the post-conversion search query generated in step S1506. On the other hand, if the determination result in step S1505 is NO, the process in steps S1506 is not executed, and thus the search query transmitted in step S1507 is the search query received in step S1501. In accordance with the search query transmitted in step S1507, the search processing unit 211 in each search processing apparatus 2 executes data search processing.

The management apparatus 1 receives a search result that is transmitted from the search processing apparatus 2 in response to the search query transmitted in step S1507. Based on the received search result, the search control unit 114 transmits, to the terminal apparatus 3, the search result that is a response to the search query (step S1508).

[Technical Advantages of Present Embodiment]

A description will be given of technical advantages of the present embodiment described above. For example, in the present embodiment, the information processing system is a database in which data having an XML format, that is, having a text format, is stored.

In this case, it is assumed that, for example, search processing involving magnitude comparison using numerical values is executed on data stored in the text format. In order to perform magnitude comparison, it is important that data in the search range have a numerical format, and thus type conversion is performed on data in the text format to generate data having a numerical format. The generated data in the numerical value is used to search for data that matches the search condition. In this case, for data type conversion during data searching, there is a problem that search performance, that is, performance of responding to a search request, declines.

In the present embodiment, the analysis-information storage unit 123 stores (accumulates) an analysis result obtained by analyzing a search query received from the terminal apparatus 3. Specifically, for example, with respect to search queries received in a predetermined period of time, the analysis-information storage unit 123 records, as an analysis result, the number of appearances of combinations of a tag and a data type designated by each search query. Then, type-converted data obtained by converting the data type for each tag into a data type having a large number of appearances in the analysis result is stored in the search-auxiliary-data storage unit 221.

Thus, when a data type having a large number of appearances in an analysis result is designated in a search query, the pre-generated type-converted data is used to execute data search processing, thus making it possible to omit data type conversion during data search processing. Accordingly, it is possible to suppress a search performance decline due to the data type conversion.

For determining the data type to be added is, for example, a mode for determining the data type based on the values of XML data stored in the XML data storage unit 121 is also conceivable. One specific example is a mode in which the value of text format data is referred to for each tag in the XML data, and what data type is designated for searching is estimated based on the contents of the data.

However, for example, there is a possibility that a text format is designated in data search processing, even for data that appears to be data indicating a numerical value as the value of data. Also, for example, even when a data type is estimated to be data indicating a date as the value of data, there is a possibility that searching is performed with a date in a Japanese calendar format or searching is performed with a date in a Western calendar format, and there is a possibility that searching is performed merely with data having a text format. When a data type to be added is determined based on the value of stored data, as described above, there is a possibility that a data type that is rarely used for searching in practice is determined to be a data type to be added or the data type to be added is not narrowed down.

In addition, since, in the present embodiment, the data type to be added is determined by analyzing an actually received search condition, a data type that is more likely to be designated for data searching even after addition may be selected as a data type to be added. Also, of data types designated in a search result, a predetermined number of data types having a large number of or a frequency of designations as a result of the analysis may be determined as data types to be added. This suppresses an unlimited increase in the amount of information stored in the tag-management-information storage unit 122 and the search-auxiliary-data storage unit 221, the increase being caused by data addition.

[Processing During Data Addition]

Figure 16:
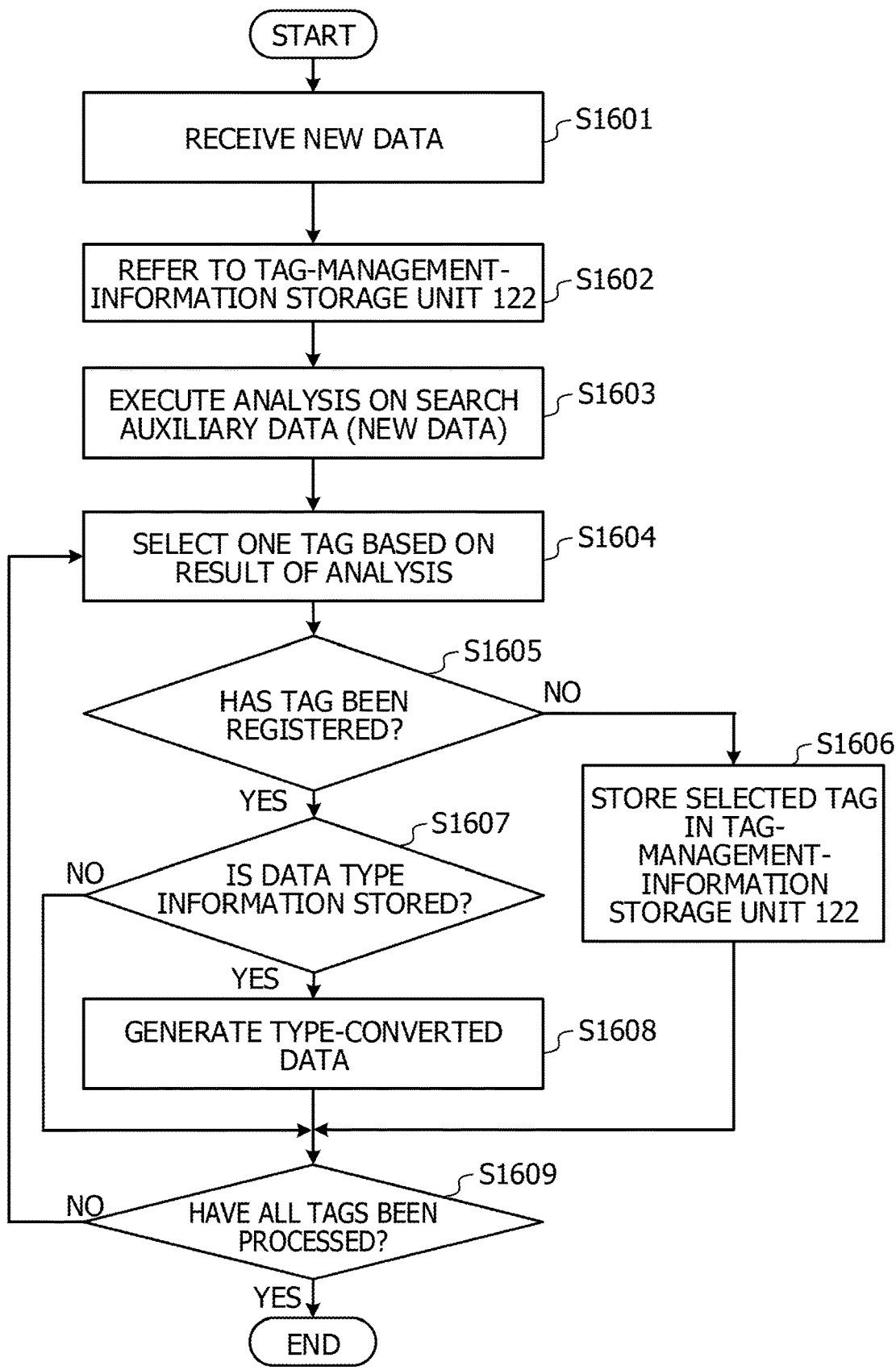
FIG. 16 is a flowchart illustrating a series of processes executed when additional data is stored.

FIG. 16 is a flowchart illustrating a series of processes executed when additional data is stored in the XML data storage unit 121. In the following description, data that is additionally stored in the XML data storage unit 121 may be referred to as "new data".

First, the data management unit 112 receives new data (step S1601). Next, the data management unit 112 refers to the tag-management-information storage unit 122 (step S1602) and executes analysis on the new data (step S1603). In this case, by referring to the tag-management-information storage unit 122, the data management unit 112 obtains a list of tags for which information is registered in the tag-management-information storage unit 122. The analysis on the new data is processing for identifying tags included in the new data.

Thereafter, the data management unit 112 selects one tag from the tags included in the new data identified as a result of the analysis executed in step S1603 (step S1604). A determination is made as to whether or not information indicating the tag selected in step S1604 has been registered in the search-auxiliary-data storage unit 221 (step S1605). In other words, the data management unit 112 determines whether or not a data value indicating the tag selected in step S1604 is included in the tag information 1221 stored in the search-auxiliary-data storage unit 221.

If information indicating the tag selected in step S1604 has not been registered (NO in step S1605), the data management unit 112 stores, in the tag-management-information storage unit 122, information about the tag selected in step S1604 (step S1606). Specifically, the data management unit 112 newly stores, in the tag information 1221, the data value indicating the tag selected in step S1604 and also stores a unique tag ID as the tag ID 1222 in association with the newly stored data value.

On the other hand, if information indicating the tag selected in step S1604 has been registered (YES in step S1605), the data management unit 112 determines that the data type information 1224 about the tag selected in step S1604 is stored in the tag-management-information storage unit 122 (step S1607).

If the data type information 1224 is stored in the tag-management-information storage unit 122 (YES in step S1607), the data management unit 112 generates type-converted data about the data value corresponding to the tag included in the new data and selected in step S1604 (step S1608). A case in which the information illustrated in FIG. 13 is stored in the tag-management-information storage unit 122 and the tag selected in step S1604 is the tag "/root/cost" will be described by way of example. In this case, the data management unit 112 generates type-converted data obtained by converting the data value corresponding to the tag selected in step S1604 into the data type indicated by the data type information 1224, that is, into a numerical-format data value. The data management unit 112 then embeds the generated type-converted data into the received new data (XML data). Thus, when data for a tag for which a data type to be added is determined is included in new data, type-converted data is generated at the time of addition of the new data. If the data type information 1224 is not stored in the tag-management-information storage unit 122 in step S1607 (NO in step S1607), the process in steps S1608 is omitted.

Thereafter, the data management unit 112 determines whether or not the tags included in the new data identified as a result of the analysis executed in step S1603 have all been selected in step S1604 (step S1609). If unselected tags exist (NO in step S1609), the process returns to step S1604 in which the data management unit 112 selects one tag from the unselected tags and executes the subsequent processes again. If all of the tags included in the new data have been selected (YES in step S1609), the series of processes illustrated in FIG. 16 ends.

When new data is stored, the above-described processing is executed, so that type-converted data can be pre-generated and stored even for the new data.

In addition, for example, in the process exemplified in step S1206 and so on, through scan and analysis of the new data (XML data) in which the type-converted data is embedded, various types of information that are to be stored in the search-auxiliary-data storage unit 221 and that corresponds to the new data are obtained.

[Hardware Configuration]

Figure 17:
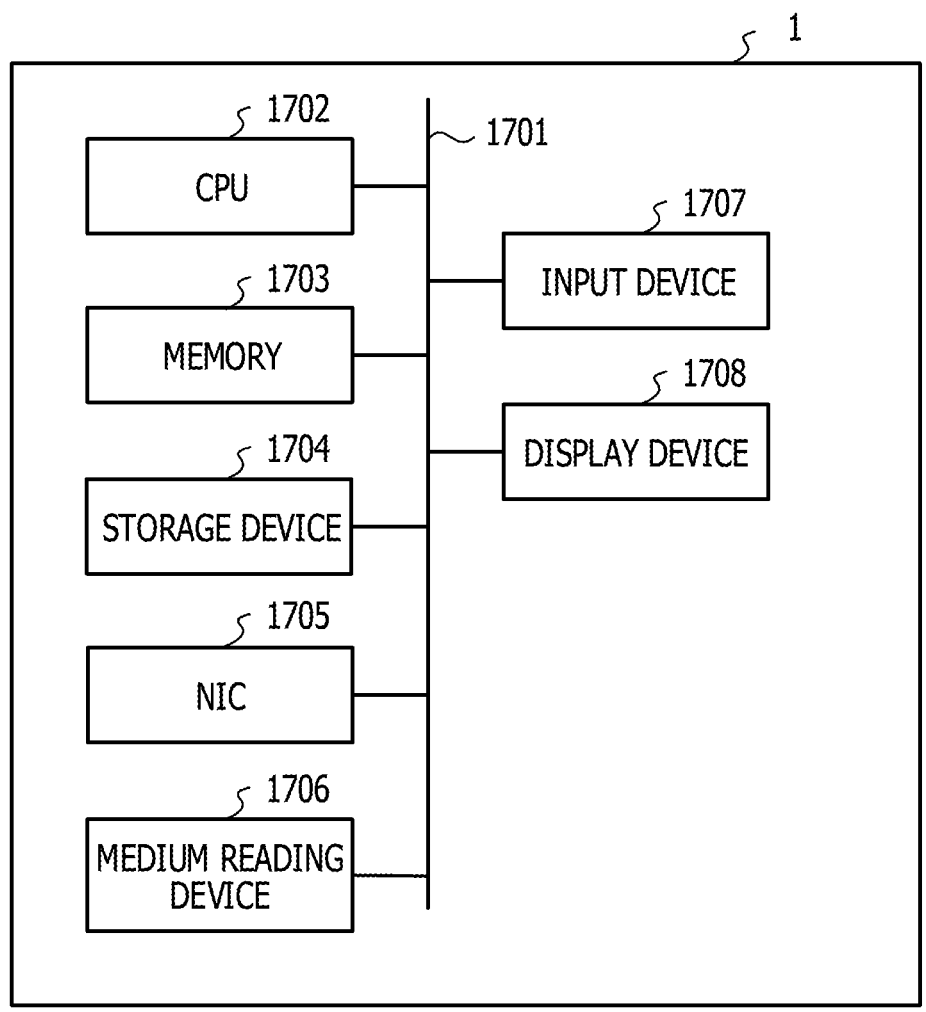
FIG. 17 illustrates an example of the hardware configuration of the management apparatus in the present embodiment.

FIG. 17 illustrates an example of the hardware configuration of the management apparatus 1 in the present embodiment. As described below, the search processing apparatuses 2-1 to 2-*n*, the terminal apparatus 3, and so on may also have configurations that are the same as or similar to the configuration illustrated in FIG. 17.

The management apparatus 1 is, for example, an information processing apparatus including a central processing unit (CPU) 1702, a memory 1703, a storage device 1704, a NIC 1705, a medium reading device 1706, an input device 1707, and a display device 1708, which are connected to each other through a bus 1701.

The CPU 1702 performs various types of operation control in the management apparatus 1. A program for executing the various types of processing described above in the present embodiment and various types of data used for the various types of processing are stored in the memory 1703 and the storage device 1704. The storage device 1704 is, for example, a storage medium, such as a hard disk drive (HDD) or a solid-state drive (SSD).

The CPU 1702 may read the program stored in the memory 1703 or the storage device 1704 and execute processing and control to thereby realize the functional units included in the processing unit 110 illustrated in FIG. 2. Each of the memory 1703 and the storage device 1704 may function as, for example, the storage unit 120 illustrated in FIG. 2. The CPU 1702 may also be replaced with a hardware circuit, such as a micro processing unit (MPU) or an application-specific integrated circuit (ASIC).

The NIC 1705 is hardware used for data transmission/reception through a wired or wireless network. Under the control of the CPU 1702, the NIC 1705 is capable of functioning as, the communication unit 101.

The medium reading device 1706 is a device for reading data from a recording medium. Examples of the medium reading device 1706 include a disk drive for reading data stored in a disc medium, such as a compact disc read-only memory (CD-ROM) or a digital versatile disc read-only memory (DVD-ROM), and a card slot for reading data stored in a memory card. Part or all of data stored in the storage unit 120 described above may be stored in a recording medium that is readable using the medium reading device 1706.

The input device 1707 is a device for receiving inputs and designations from users (including a system administrator). Examples of the input device 1707 include a keyboard, a mouse, and a touchpad. Under the control of the CPU 1702, the display device 1708 displays various types of information. The display device 1708 is, for example, a liquid-crystal display.

Since the search processing apparatuses 2-1 to 2-n and the terminal apparatus 3 in the present embodiment may be implemented using computers having hardware configurations that are the same as or similar to the hardware configuration illustrated in FIG. 17, a description thereof is not given hereinafter. However, specific hardware (a model, performance, and so on) of the CPU, the memory, the storage device, the NIC, the medium reading device, the input device, and the output device may differ from one apparatus to another.

Also, although, in the present embodiment, a system including one management apparatus 1 and a plurality of search processing apparatuses 2 as hardware has been described as an example of the information processing system, the number of search processing apparatuses 2 is not limited to any particular number, including one. Also, for example, the information processing system may be implemented as one piece of hardware having the functions of the management apparatus 1 and the search processing apparatuses 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   searching, in response to receiving a search condition which requests a search of data and designates an output data type from among a plurality of output data types, the data based on the search condition in a database;
   counting, for each of the searched data, a number of designations of each of the plurality of output data types in the search condition;
   specifying, for each of the searched data, one or more output data types corresponding to one of a first output data type with a largest number of designations, second output data types with numbers of designations of a predetermined number from a top and one or more third output data types with one or more numbers of designations larger than or equal to a threshold;
   storing, in a storage device, type-converted data obtained by converting the searched data into the specified one or more output data types in association with the searched data;
   generating, upon receiving, from a terminal device, a new search condition which requests the search of the data and designates the specified one or more output data types, a search result by using the type-converted data stored in the storage device; and
   transmitting the search result to the terminal device.

2. The non-transitory computer-readable storage medium according to claim 1, wherein pieces of type-converted data are stored in descending order of the number of designations when the one or more output data types correspond to the second output data types or the one or more third output data types.

3. The non-transitory computer-readable storage medium according to claim 1, the process further comprises:
   generating type-converted data corresponding to specified data when the specified data is to be added to the database by converting the specified data into the one or more output data types; and
   storing the type-converted data corresponding to the specified data in the storage device.

4. The non-transitory computer-readable storage medium according to claim 1, wherein the data stored in the database is eXtensible Markup Language (XML) format data; and wherein in the searching, the data is identified by a tag information, included in the XML format data, designated by the search conditions.

5. The non-transitory computer-readable storage medium according to claim 1, wherein the specified one or more output data types are determined based on a function included in the search condition.

6. A search control method executed by a computer, the search control method comprising:
   searching, in response to receiving a search condition which requests a search of data and designates an output data type from among a plurality of output data types, the data based on the search condition in a database;
   counting, for each of the searched data, a number of designations of each of the plurality of output data types in the search condition;
   specifying, for each of the searched data, one or more output data types corresponding to one of a first output data type with a largest number of designations, second output data types with numbers of designations of a predetermined number from a top and one or more third output data types with one or more numbers of designations larger than or equal to a threshold;

storing, in a storage device, type-converted data obtained by converting the searched data into the specified one or more output data types in association with the searched data;

generating, upon receiving, from a terminal device, a new search condition which requests the search of the data and designates the specified one or more output data types, a search result by using the type-converted data stored in the storage device; and transmitting the search result to the terminal device.

7. A search control device comprising:

a memory; and a processor coupled to the memory and the processor configured to execute a process, the process including:

searching, in response to receiving a search condition which requests a search of data and designates an output data type from among a plurality of output data types, the data based on the search condition in a database;

counting, for each of the searched data, a number of designations of each of the plurality of output data types in the search condition;

specifying, for each of the searched data, one or more output data types corresponding to one of a first output data type with a largest number of designations, second output data types with numbers of designations of a predetermined number from a top and one or more third output data types with one or more numbers of designations larger than or equal to a threshold;

storing, in a storage device, type-converted data obtained by converting the searched data into the specified one or more output data types in association with the searched data;

generating, upon receiving, from a terminal device, a new search condition which requests the search of the data and designates the specified one or more output data types, a search result by using the type-converted data stored in the storage device; and transmitting the search result to the terminal device.

* * * * *